United States Patent [19]

Largman et al.

[11] 4,433,116

[45] Feb. 21, 1984

[54] PROCESS FOR INCREASING THE RELATIVE VISCOSITY OF POLYCAPROLACTAM WITH PHOSPHITE COMPOUND

[75] Inventors: Theodore Largman, Morristown; Shaul M. Aharoni, Morris Plains, both of N.J.

[73] Assignee: Allied Corporation, Morris Township, Morris County, N.J.

[21] Appl. No.: 453,210

[22] Filed: Dec. 27, 1982

Related U.S. Application Data

[63] Continuation-in-part of Ser. No. 280,563, Jul. 6, 1981, abandoned.

[51] Int. Cl.$^3$ ............................................. C08G 69/48
[52] U.S. Cl. ................................... 525/420; 524/147; 524/149; 524/151; 525/419
[58] Field of Search ................................ 525/420, 419

[56] References Cited

U.S. PATENT DOCUMENTS 2,493,597  1/1950  Rothrock et al. .................. 525/420
3,551,548  12/1970  Brignac et al. .................. 264/176 F
3,763,113  10/1973  Burrows et al. .................... 525/420

*Primary Examiner*—Harold D. Anderson
*Attorney, Agent, or Firm*—Alan M. Doernberg; Gerhard H. Fuchs; Kenneth E. Stroup, Jr.

[57] ABSTRACT

A process for rapidly and substantially decreasing the melt index and increasing the viscosity of polymers of caprolactams during melt processing by forming a molten mixture of the polymer and a phosphite compound and heating the mixture until the desired change in melt index and viscosity are obtained.

16 Claims, No Drawings

PROCESS FOR INCREASING THE RELATIVE VISCOSITY OF POLYCAPROLACTAM WITH PHOSPHITE COMPOUND

DESCRIPTION

CROSS REFERENCE TO RELATED APPLICATION

This application is a continuation-in-part of our co-pending Application Ser. No. 280,563, filed July 6, 1981, now abandoned.

BACKGROUND OF THE INVENTION

1. Field of the Invention

This invention relates to a rapid process for substantially increasing the molecular weight and viscosity of polymers of caprolactam during melt processing. More specifically, this invention relates to a process in which the increase in the viscosity is effectuated by the addition of an effective amount of a narrow class of phosphite compounds. Polymeric compositions prepared in accordance with the process of this invention are capable of being fabricated into useful shaped articles of manufacture, e.g. filaments, both mono- and multifilaments, films, tapes, ribbons, rods, laminates, etc.

2. Description of the Prior Art

Polymers of caprolactam are disclosed in the prior art as having many and varied uses. For example, these polymers can be formed into filaments in which the polymer chains are oriented along the filament axis. Such filaments have many uses in commercial applications, as for example, in the production of fibers for tire cord, textiles and the like. Similarly, these polymers can be fabricated into other useful shaped articles, as for example, gears, lawn mower housings, skate boards and the like.

The melt index of polymers of caprolactam provides an indication of the viscosity of the polymers and of their molecular weights, i.e. chain length, in that these parameters are inversely related. In general, polymers having low melt indexes are desirable because of the improved properties of fibers and other shaped articles made therefrom. For example, fibers made from polymers of caprolactam having relatively low melt indexes have increased tensile strength, durability and impact resistance.

Several processes have been proposed in the prior art for increasing the viscosity and molecular weight of polyamides, such as poly(hexamethyleneadipamide). For example, U.S. Pat. No. 3,763,113 discloses a method for increasing the molecular weight of polyamides having recurring -CONH-alkylene-NHCO-alkylene- units, such as poly(hexamethyleneadipamide), by treating the polyamide with a phosphoric acid derivative in the presence of an inert gas, such as nitrogen. Similarly, U.S. Pat. Nos. 3,551,548 and 3,763,113, each broadly describes a method for increasing the relative viscosity of polyamides generally, and poly(hexylamethylene adipamide) specifically, by sweeping a molten mixture of the polyamide and a phosphorous compound with an inert gas.

Each of these processes provides various adverse effects. For example, in each process an inert gas is employed, which in high concentrations causes uneven finishing, i.e. variations in the degree of polymerization throughout the polyamide, which results in a nonuniform polymer. Furthermore, inert gases are expensive, and require additional equipment and monitoring which can increase the cost of commercialization of the process, even though the inert gas is used in small amounts.

A further defect in these processes is that broadly speaking it is not readily apparent that they can be employed with polyamides of the type exemplified by polycaprolactam. For example, U.S. Pat. No. 3,763,113 clearly restricts the use of the process of that patent to polyhexamethylene adipamide type polyamides. While the disclosures of U.S. Pat. Nos. 3,551,548 and 3,763,113 are not so restrictive, as will be shown hereinbelow the phosphorous compounds described as useful in the processes of those patents cannot be used with polyamides of the type epitomized by polycaprolactam (Nylon 6), polyundecanolactam (Nylon 11) and polylauryllactam (Nylon 12).

SUMMARY OF THE INVENTION

Surprisingly, we have discovered that while in general the phosphorous compounds of the prior art are not sufficient to significantly decrease the melt index during melt processing of polyamides of the type having recurring structural units of the formula:

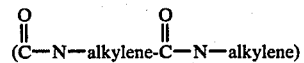

a narrow class of phosphite compounds are effective for decreasing the melt index of polycaprolactam (Nylon 6), a specific polyamide of that class, to an extent much greater than would be expected in view of the prior art. This result is especially surprising in view of the fact that the same phosphite compounds are either not effective or significantly less effective when used in processes to decrease the melt indexes and increase the viscosities of other related polyamides prepared by the polymerization of lactams, such as Nylon 11 and Nylon 12. In accordance with the foregoing, there is provided a process for substantially decreasing the melt index and substantially increasing the relative viscosity of a poly(caprolactam) which comprises:

(a) forming a mixture of poly(caprolactam) and and effective amount of one or more phosphite compounds of the formula

wherein:
$R_1$ is alkyl or haloalkyl having from about 2 to about 12 carbon atoms or phenyl, either unsubstituted or substituted with one or more halo or alkyl substituents having 1 to 12 carbon atoms; and $R_2$ and $R_3$ are individually $R_1$, hydrogen or a metal cation; and (b) heating said mixture for a period of time between about 1 minute and about 15 minutes at a temperature between about the melting point of said polymer and about 320° C. to produce a polymer having increased relative viscosity; wherein said relative viscosity of said polymer of caprolactam is increased by at least about 20%.

As used herein, "an effective amount" is an amount of the phosphite compound which is effective to cause the decrease in melt index and increase in viscosity. As used herein, the "melt index" denotes a particular combination of test conditions for measuring the rate of extrusion of polycaprolactam through an orifice of a specified length and diameter. The equipment is called a melt indexer because it permits the indexing or classification of melted resins according to an agreed upon convention. The device has been adopted and standarized as an ASTM Tentative Method of Measuring Flow Rates of Thermoplastics by Extrusion Plastometer (D 1238), ISO Recommendation, the Determination of the Index of Fluidity of Polyethylene Compounds (R317), British Standards BS 1972 and BS 2782 Method 105C, and Government Department Electrical Specification Number 27, 1950, Great Britain. Manufacturers of melt index equipment meeting the ASTM requirements are: Appalachian Electronics, Inc., Ronceverte, W. Va.; F. F. Slocomb Corporation, Wilmington, Del.; Tinius Olson Testing Machine Company, Willow Grove, Pa.; and W. J. Hacker and Company, Inc., West Caldwell, N.J.

As used herein, "viscosity" denotes the internal friction of the polyamide, and is well known in the art. A wide variety of viscometers is available for measurement of viscosity, such as capillary, rotational, orifice, falling ball, and oscillatory types. They are described in Barr, "A Monograph of Viscometry", and Kirk and Othmer, "Encyclopedia of Chemical Technology", Vol 14, pp 756–775, The Interscience Encyclopedia, INC, New York (1955).

In another aspect, this invention relates to polymeric compositions prepared in accordance with the process of this invention, and articles of manufacture comprising such compositions.

DETAILED DESCRIPTION OF THE INVENTION

The process of this invention is conveniently carried out in two steps. The first step of the process of this invention consists of forming an intimate mixture comprising the polycaprolactam and an effective amount of a phosphite compound of the formula:

wherein $R_1$, $R_2$ and $R_3$ are as described hereinabove. The second step of the process comprises heating the mixture at a temperature between about the melting point of the polymer and about 320° C. until the relative viscosity of said polymer increases by at least about 20%. The manner in which the mixture is formed is not critical, and any conventional method can be employed. During the mixing, an effective amount of the phosphite compound, preferably in liquid, granulated or powdered form, is added to the polycaprolactam. Heating of the mixture is then commenced and continued until the required decrease in melt index and increase in viscosity has been obtained.

Alternatively, the components of the mixture can be granulated, and the granulated components mixed dry in a suitable mixer as uniformly as possible. Thereafter the polycaprolactam component is melted in an extruder and a molten mixture is formed. As described above, the mixture is heated in the extruder until the desired decrease in the melt index and increase in viscosity has been obtained and is thereafter expressed with cooling.

The order of mixing of the various components is not critical. Thus, the order of addition of the polycaprolactam and phosphite components, or other optional components to be described in more detail hereinbelow to form the mixture, can be varied as desired.

The process of this invention can be carried out in a batchwise or discontinuous fashion, as for example, carrying out the process in a sealed container. Preferably, the process can be carried out in a continuous fashion in single or multiple reaction zones, as for example, by use of an extruder as described hereinabove.

The reaction temperature should be at least as high as the melting point of the particular poly(caprolactam) employed and below the degradation temperature of that polymer. Reaction temperatures that are suitable for the process of this invention range from about 260° C. to about 320° C. In the preferred embodiments of this invention, the reaction temperatures that should be employed range from about 275° C. to about 310° C.

Process pressures are not critical and can be varied widely without adversely affecting the process. Consequently, the process can be conducted at subatmospheric, atmospheric or super-atmospheric pressures.

The process is carried out for a time sufficient to decrease the melt index and increase the viscosity to the desired extent. Reaction times can be varied over a range between about 1 minute and about 15 minutes, as desired. Usually, reaction times will depend on factors such as the viscosity and melt index of the poly(caprolactam) precursor, desired viscosity and melt index of the final product, reaction temperatures, phosphite compound employed and its concentration, and other factors known to those of skill in the art to affect reaction times. When maximum decreases in melt indexes and increases in viscosities are desired, process times may have an effect on the maximum melt index and viscosity attained. For example, experimentation has indicated that in the particularly preferred embodiments of this invention, melt indexes decrease to a minimum value and viscosities increase to a maximum value, and that continued subjection of the mixture to the conditions of this invention can result in an increase in melt index and decrease viscosity due to thermal degradation of the product. In the preferred embodiments of this invention, reaction times will range from about 2 minutes to about 12 minutes.

Best results are obtained when the process of this invention is carried out in the presence of as little water as possible. Ideally, the conditions will be anhydrous, and this represents the most preferred embodiment of the invention. The weight percent of water should not be greater than 1.65 weight percent based on the total weight of the mixture. However, better results can be obtained when as little as 0.15 weight percent water based on the total weight of the mixture is present therein. In the preferred embodiments of the invention, the weight percent of water is less than about 0.1 weight percent, and in the particularly preferred embodiments, the weight percent of water is less than about 0.05 weight percent on the same basis. Humidity control may be achieved by conducting the process under dry air, nitrogen or other inert gases.

Phosphite compounds useful in the conduct of the process of this invention are those of the formula:

wherein $R_1$, $R_2$, and $R_3$ are as described hereinabove. Illustrative of phosphite compounds suitable for use in the practice of this invention are those in which $R_1$, $R_2$ and $R_3$ are the same and are selected from the group consisting of lower alkyl or haloalkyl having from about 2 to 12 carbon atoms, such as ethyl, propyl chloroethyl, tert-butyl, isopropyl, 2-chlorobutyl, butyl, isobutyl, pentyl, neopentyl, nonyl and the like; and phenyl and halophenyl, such as 4-chlorophenyl, 2,4-dichlorophenyl and the like. Additionally, $R_1$, $R_2$ and $R_3$ may be phenyl, either unsubstituted or substituted with one or more alkyl groups having 1 to 12 carbon atoms, such as methyl, ethyl, tert-butyl, with di-t-butylphenyl being an especially preferred moiety. Phosphite compounds for use in the preferred embodiments are those in which $R_1$, $R_2$ and $R_3$ are the same and are nonylphenyl, phenyl, ethyl or butyl. The particularly preferred phosphite compounds are tributyl and triphenyl phosphite because of their apparently unique ability to selectively decrease the melt index and increase the viscosity of poly(caprolactam) to an outstanding degree, while being totally ineffective when used with other polyamides as for example, poly(undecanolactam) (Nylon 11) and poly(lauryllactam) (Nylon 12), or much less effective when used with poly(hexamethyleneadipamide)

In another embodiment of this invention, phosphite compounds of the following general formulas may be employed in the process:

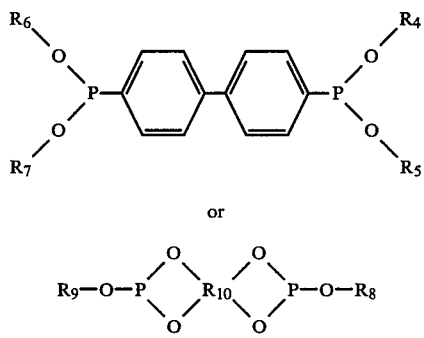

wherein $R_4$, $R_5$, $R_6$, $R_7$, are the same or different, $R_8$ and $R_9$ are the same or different, and $R_4$, $R_5$, $R_6$, $R_7$, $R_8$ and $R_9$ may be the same as $R_1$, $R_2$, or $R_3$ as described above and wherein $R_{10}$ is pentaerythritol.

An effective amount of the phosphite compound is employed in carrying out the process of this invention. As used herein, "an effective amount" is an amount of a useful phosphite compound as described hereinabove which is sufficient to decrease the melt index and increase the viscosity of the poly(caprolactam) to any extent. Normally, the greater the amount of the phosphite compound employed, the greater the decrease in melt index and increase in viscosity attained, and conversely, the less the amount of phosphite compound employed, the less the decrease in melt index and increase in viscosity attained. In the preferred embodiments of this invention employing preferred phosphite compounds, the quantity of phosphite compound employed is such that the viscosity of the product is at least about 20% greater than the viscosity of the unmodified poly(caprolactam). In the particularly preferred embodiments, the difference in viscosities is at least about 30%. The aforementioned preferred increases in viscosities (decreases in melt index) can be achieved when the weight percent of the phosphite compound employed is at least about 0.05 weight percent based on the total weight of the mixture. The particularly preferred increases in viscosities may be achieved when the weight percent of the phosphite compound is in the range of from about 0.05 to about 2 weight percent, and amongst these particularly preferred embodiments, those in which the weight percent of phosphite compound is in the range of from about 0.1 to about 0.6 weight percent on the same basis are most preferred.

Phosphite compounds useful in the conduct of the process of this invention are known compounds which can be obtained from commercial sources or prepared in accordance with known procedures.

Polycaprolactam suitable for use in this invention is a known polyamide composition, typically, having a molecular weight in the range of from about 10,000 to about 150,000, and preferably in the range of from about 15,000 to about 80,000. Such polymers can be conveniently prepared in accordance with known techniques, as for example, by adding water to caprolactam to open the ring, and, thereafter, removing water at elevated temperatures where the linear polycaprolactam forms. Alternatively, these polymers can be obtained from commercial sources, as for example, from Allied Corporation under the trademark Capron ™.

The terminal groups of the polycaprolactam are preferably a mixture of amino functions and carboxylic acid functions. In the particularly preferred embodiments of this invention, at least about 20% of the terminal functions will be amino groups and at least about 20% of the terminal functional groups will be carboxyl groups. Amongst these particularly preferred embodiments, those in which from about 35 to about 65 percent of the terminal groups are amino functions and the remainder are carboxyl groups are most preferred. Various other optional ingredients, which are normally included in polyamide compositions, may be added to the mixture at an appropriate time during the conduct of the process. Normally, these optional ingredients can be added either prior to or after melting of the polycaprolactam. Such optional components include fillers, plasticizers, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

The composition prepared in accordance with the process of this invention preferably includes a particulate filler, which functions to increase the modulus and stiffness of the composition, and provides a more economical composition. Any conventional filler can be employed provided that it provides all or a portion of the above-identified functions and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include glass fibers, alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, etc., such fillers are well known materials and are readily available. The foregoing recited fillers are illustrative only and are not meant to limit the scope of the fillers that can be employed in this invention. In the preferred embodiments of this invention, fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polycapolactam component and in the particularly preferred embodiment is in the range of from about 30 to about 90 weight percent on the same basis.

It is also very desirable to include a plasticizer of the type known in the art for use with polycaprolactam. Useful plasticizers include caprolactam, mixtures of N-ethyl o-,p-toluenesulfanamides and the like.

The process of this invention provides polycaprolactam having significantly increased molecular weights. Such polycaprolactam is extremely useful as the cord in pneumatic tires. Because of the additional and unexpectedly large decrease in melt index and increase in viscosity caused by the process of this, the polycaprolactam product and filaments, fibers and yarn products produced therewith have significantly better properties than polycaprolactam that do not include the phosphite compound. For example, such products prepared in accordance with this invention have greater breaking strength, light stability, tenacity, and are more resistant to depolymerization than products including other phosphorous type compounds. They are thermoplastic materials from which molded articles of manufacture having valuable properties can be produced by the conventional shaping processes, such as casting, injection molding and extruding. Examples of such moldings are components for technical equipment, apparatus castings, household equipment, sports equipment, components for the electrical and electronics industries and electrical insulations, car components, circuits, fibers and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The compositions prepared according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example, based on vinyl resins. The sheets and panels can also be laminated with other plastic films, and this is preferably effected by joint extrusion, the sheets being bonded in the molten state. The surfaces of the sheets and panels, including those in the embossed form, can be improved or finished by conventional methods, for example, by lacquering or by the application of protective films.

EXAMPLES Ia TO Vd

In these examples, various representative embodiments of this invention were carried out employing the following general mixing and extrusion procedure.

A. Mixing

The base substrate nylon was received as 0.32 cm pellets. After weighing in wide-mouth jars the nylon samples were dried for 16 hours at 100°–110° C. in a vacuum oven. This drying step was done prior to blending, and the sample was kept in sealed jars during interim period to prevent re-adsorption of water from atmospheric humidity.

Weighed amounts of phosphite compound were added to the nylon and the sealed jars were rotated on a rolling mill for 0.5 hr. This action effectively coated the surface of the pellets.

B. Extrusion

Melt blending was accomplished using a Wayne extruder with a single stage mixing screw (2.54 cm diameter, 65.5 cm long). Nominal temperatures of molten polymer in the barrel of the extruder and the residence time of the melt at said temperatures are set forth in Table I below. The single strand extrudate proceeded from the die into a water bath where it cooled and solidified. From the water bath the strand exited to a small Wayne pelletizer.

Pellets were vacuum dried and subjected to melt index (M.I.) determinations on a dead weight piston plastometer employing procedures of ASTM D-1238, D-2116, D-3159 and D-3364. Solution viscosity was measured at 23° C. at 0.5% concentration in m-cresol. The physical properties (i.e. relative viscosity (R) and formic acid viscosity (FAV)) of the polymers obtained via the process of this invention are set forth in Table I below:

TABLE I

| EX | PHOSPHITE CPD (WT %) | POLYMER | TEMP. (°C.) | TIME (MIN) | R* | FAV* |
|---|---|---|---|---|---|---|
| Ia | Control | Nylon 8207[1] | 265 | 10.00 | 1.85 | 64 |
| Ib | Control | Nylon 8207 | 305 | 3.75 | 1.84 | 63 |
| Ic | 1.0% TBP* | Nylon 8207 | 265 | 10.00 | 3.30 | 274 |
| Id | 0.5% TBP | Nylon 8207 | 265 | 10.00 | 2.36 | 110 |
| Ie | 1.0% TEP* | Nylon 8207 | 265 | 10.00 | 2.35 | 110 |
| If | 1.0% TEP | Nylon 8207 | 265 | 10.00 | 3.21 | 251 |
| Ii | 1.0% TPP* | Nylon 8207 | 265 | 7.50 | 2.24 | 93 |
| Ij | 1.0% TPP | Nylon 8207 | 285 | 3.75 | 2.57 | 130 |
| Ik | 1.0% TPP | Nylon 8207 | 305 | 3.75 | 3.98 | >>300 |
| IIa | Control | LMW Nylon 6[2] | 265 | 10.00 | 1.42 | 36 |
| IIb | 0.3% TPP | LMW Nylon 6 | 265 | 10.00 | 2.04 | 77 |
| IIIa | Control | A-Nylon[3] | 265 | 10.00 | 1.55 | 43 |

TABLE I-continued

| EX | PHOSPHITE CPD (WT %) | POLYMER | TEMP. (°C.) | TIME (MIN) | R* | FAV* |
|---|---|---|---|---|---|---|
| IIIb | 0.5% TPP | A-Nylon | 265 | 10.00 | 2.41 | 116 |
| IVa | Control | Xtrabond[4] | 265 | 10.00 | 1.72 | — |
| IVb | 0.4% TBP | Xtrabond | 265 | 10.00 | 2.38 | — |
| IVc | 0.6% TBP | Xtrabond | 265 | 10.00 | 2.30 | — |
| Va | Control | B-Nylon[5] | 265 | 10.00 | 1.73 | 53 |
| Vb | 0.5% TPP | B-Nylon | 265 | 10.00 | 2.26 | 99 |
| Vc | 0.5% TPP | B-Nylon | 300 | 3.75 | 2.26 | 99 |
| Vd | 1.0% TPP | B-Nylon | 300 | 3.75 | 2.69 | 136 |

*TBP — Tributyl Phosphite
*TEP — Triethyl Phosphite
*TPP — Triphenyl Phosphite
*R — Relative Viscosity
*FAV — Formic Acid Viscosity

[1]"Nylon 8207 TM" is a polycaprolactam, produced by Allied Corp., containing an equal number of amine and carboxyl end groups. Mw = 38,000
[2]"LMW Nylon 6" is a low molecular weight polycaprolactam with Mw = 24000.
[3]"A-Nylon TM" is a polycaprolactam which has an unbalanced amino-carboxyl end group distribution in which amino end groups predominate.
[4]"Xtrabond TM" is a polycaprolactam produced by Allied Corp. that has an unbalanced amine-carboxyl end group distribution in which amino groups predominate.
[5]"B-Nylon TM" is a polycaprolactam which has an unbalanced amino-carboxyl end group distribution in which carboxyl groups predominate.

COMPARATIVE EXAMPLE I

Employing the mixing and extrusion procedures of Examples Ia to Vd hereinabove, several experiments were carried out to illustrate the criticality of the nylon 6 component to the advantageous results provided by the particularly preferred embodiments of the process of this invention. The results of these experiments are set forth in Table II hereinbelow.

TABLE II

| Example | Wgt. % Phosphite Compound | Nylon | R | FAV |
|---|---|---|---|---|
| VIa | Control | Nylon 11 powder | 1.13 | |
| VIb | 0.5% Tributyl phosphite | Nylon 11 powder | 1.27 | |
| VIIa | Control | Nylon 12 pellets | 1.25 | |
| VIIb | 0.5% Tributyl Phosphite | Nylon 12 pellets | 1.30 | |
| VIIIa | Control | Nylon 8207 | 1.85 | |
| VIIIb | 0.6% Tributyl Phosphite | Nylon 8207 | >3.50 | |
| VIIIc | 0.5% Tributyl Phosphite | Nylon 8207 | 2.36 | |
| IXa | Control | Xtrabond Nylon | 1.72 | |
| IXb | 0.6% Tributyl Phosphite | Xtrabond Nylon | 2.30 | |

COMPARATIVE EXAMPLE II

Employing the mixing and extrusion procedures of Examples Ia–Vd hereinabove, several experiments were carried out to illustrate the criticality of the phosphite additive to the advantageous results provided by the process of this invention. The results of these experiments are set forth in Table III, hereinbelow:

TABLE III

| Example | Wgt % Phosphite Compound | Nylon | R | FAV |
|---|---|---|---|---|
| Xa | 1.0% Trioctyl Phosphite | Nylon 8207 | 2.16 | 86 |
| Xb | 1.0% Tri-(2-ethylhexyl) phosphite | Nylon 8207 | 2.04 | 77 |
| Xc | 1.0% phenyl phosphonic acid | Nylon 8207 | 1.81 | — |
| Ic | 1.0% Tributyl phosphite | Nylon 8207 | 3.30 | 270 |
| If | 1.0% Triphenyl phosphite | Nylon 8207 | 3.21 | 251 |
| Ie | 1.0% Triethyl phosphite | Nylon 8207 | 2.35 | 110 |

COMPARATIVE EXAMPLE III

Employing the mixing and extrusion procedures of Examples Ia to Vd hereinabove, several experiments were carried out to illustrate the criticality of the weight percent water in the mixture to the advantageous results provided by preferred embodiments of the process of this invention. In these experiments, the process was first attempted with the reaction mixture of Nylon 8207 TM and 0.6 weight percent tributyl phosphite which contained about 0.165% water. No reaction or increase in reduced viscosity (R) was observed. Thereafter the nylon composition was dried to provide a mixture containing only about 0.04% water and the reaction was again attempted. The reaction proceeded vigorously.

What is claimed is:

1. A process for decreasing the melt index and increasing the viscosity of polymers of caprolactam that comprises:
   (a) forming a mixture of one or more of said polymers and an effective amount of one or more phosphite compounds of the formula:

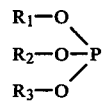

wherein:
   $R_1$ is alkyl or haloalkyl having from 2 to 12 carbon atoms or phenyl either unsubstituted or substituted with one or more halo or alkyl substituents having 1 to 12 carbon atoms;
   $R_2$ and $R_3$ are individually $R_1$, hydrogen or a metal cation; and
   (b) heating said mixture for a period of time between about 1 minute and about 15 minutes at a temperature between about the melting point of said polymer and about 320° C. to produce a polymer having increased relative viscosity; wherein said relative viscosity of said polymer of caprolactam is increased by at least about 20%.

2. A process according to claim 1 wherein said time is between about 2 minutes and about 12 minutes, and said temperature is between about 275° C. and about 310° C.

3. A process according to claim 1 wherein $R_1$, $R_2$ and $R_3$ are the same and are alkyl having from 2 to 12 carbon atoms.

4. A process according to claim 3 wherein $R_1$, $R_2$ and $R_3$ are n-butyl.

5. A process according to claim 3 wherein $R_1$, $R_2$ and $R_3$ are ethyl.

6. A process according to claim 1 wherein $R_1$, $R_2$ and $R_3$ are the same and are phenyl or phenyl substituted with at least one alkyl moiety having 1 to 12 carbon atoms.

7. A process according to claim 6 wherein $R_1$, $R_2$ and $R_3$ are phenyl.

8. A process according to claim 6 wherein $R_1$, $R_2$ and $R_3$ are selected from the group consisting of di-t-butylphenyl and nonylphenyl.

9. A process according to claim 1 wherein less than about 80% of the terminal groups of said polymers are carboxyl function based on the total number of terminal groups and the remainder of said groups are amino functions.

10. A process according to claim 9 wherein from about 35 to about 65 percent of said terminal groups are carboxyl functions and the remainder of said groups are amino functions.

11. A process according to claim 1 wherein said molten mixture contains from about 0.05 to about 2 weight percent of said phosphite compounds based on the total weight of said mixture.

12. A process according to claim 11 wherein said weight percent of said phosphite compounds is from about 0.1 to about 0.6.

13. A process according to claim 1 which comprises the additional step of adding to said mixture one or more optional components selected from the group consisting of fillers, plasticizers, colorants, fire retardants, mold release agents, antioxidants, antistatic agents, and ultraviolet light stabilizers.

14. A process for decreasing the melt index and increasing the viscosity of polymers of caprolactam that comprises:
(a) forming a mixture of one or more of said polymers and an effective amount of one or more phosphite compounds of the formula:

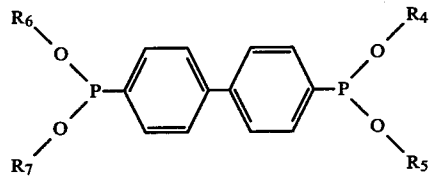

wherein:
$R_4$ is alkyl or haloalkyl having from 2 to 12 carbon atoms or phenyl either unsubstituted or substituted with one or more halo or alkyl substituents having 1 to 12 carbon atoms;
$R_5$, $R_6$ and $R_7$ are individually $R_4$, hydrogen or a metal cation; and
(b) heating said mixture for a period of time between about 1 minute and about 15 minutes at a temperature between about the melting point of said polymer and about 320° C. to produce a polymer having increased relative viscosity; wherein said relative viscosity of said polymer of caprolactam is increased by at least about 20%.

15. A process according to claim 4 wherein $R_4$, $R_5$, $R_6$ and $R_7$ are di-t-butylphenyl.

16. A process according to claim 3 wherein $R_1$, $R_2$, and $R_3$ are the same and are nonylphenyl.

* * * * *